United States Patent
Marini et al.

(10) Patent No.: US 9,914,833 B2
(45) Date of Patent: Mar. 13, 2018

(54) BIODEGRADABLE POLYMER COMPOSITION FOR THE MANUFACTURE OF ARTICLES HAVING A HIGH HEAT DEFLECTION TEMPERATURE

(71) Applicant: Novamont S.p.A., Novara (IT)

(72) Inventors: Nicola Marini, Varallo Pombia (IT); Angelos Rallis, Novara (IT)

(73) Assignee: NOVAMONT S.P.A., Novara (IT)

( * ) Notice: Subject to any disclaimer, the term of this patent is extended or adjusted under 35 U.S.C. 154(b) by 0 days.

(21) Appl. No.: 14/909,536

(22) PCT Filed: Aug. 5, 2013

(86) PCT No.: PCT/EP2013/066372
§ 371 (c)(1),
(2) Date: Feb. 2, 2016

(87) PCT Pub. No.: WO2015/018428
PCT Pub. Date: Feb. 12, 2015

(65) Prior Publication Data
US 2016/0177086 A1    Jun. 23, 2016

(51) Int. Cl.
*C08L 67/04* (2006.01)
*C08L 67/02* (2006.01)

(52) U.S. Cl.
CPC ............... *C08L 67/04* (2013.01); *C08L 67/02* (2013.01); *C08L 2205/02* (2013.01); *C08L 2205/03* (2013.01)

(58) Field of Classification Search
CPC ...... C08L 67/02; C08L 67/04; C08L 2205/02; C08L 2205/03
See application file for complete search history.

(56) References Cited

U.S. PATENT DOCUMENTS

| | | | |
|---|---|---|---|
| 2005/0137356 A1* | 6/2005 | Hale | C08L 67/02 525/421 |
| 2007/0259195 A1 | 11/2007 | Chou et al. | |
| 2012/0104655 A1* | 5/2012 | Ciou | B29C 51/42 264/322 |
| 2015/0031802 A1* | 1/2015 | Marini | B29C 71/02 524/35 |

FOREIGN PATENT DOCUMENTS

| | | |
|---|---|---|
| DE | 202006001693 U1 | 3/2006 |
| EP | 2583994 A1 | 4/2013 |
| WO | WO-2006/097353 A1 | 9/2006 |
| WO | WO-2008/098889 A1 | 8/2008 |
| WO | WO 2013124301 A1 * | 8/2013 ............. C08L 67/04 |

OTHER PUBLICATIONS

Shibata, Mitsuhiro, Yusuke Inoue, and Masanao Miyoshi. "Mechanical properties, morphology, and crystallization behavior of blends of poly (L-lactide) with poly (butylene succinate-co-L-lactate) and poly (butylene succinate)." Polymer 47.10 (2006): 3557-3564.*

* cited by examiner

Primary Examiner — Nicholas E Hill
(74) Attorney, Agent, or Firm — Polsinelli PC

(57) ABSTRACT

This invention relates to a biodegradable polymer composition which is particularly suitable for use in the manufacture of articles having a high heat deflection temperature (HDT) by injection molding and thermoforming.

20 Claims, No Drawings

BIODEGRADABLE POLYMER COMPOSITION FOR THE MANUFACTURE OF ARTICLES HAVING A HIGH HEAT DEFLECTION TEMPERATURE

CROSS REFERENCE TO RELATED APPLICATIONS

This application is a National Phase filing under 35 U.S.C. § 371 of PCT/EP2013/066372 filed on Aug. 5, 2013. The entire contents of this application are hereby incorporated by reference.

This invention relates to a biodegradable polymer composition which is particularly suitable for use for the manufacture of articles having a high heat deflection temperature (HDT) by injection moulding and thermoforming.

This invention also relates to the process of producing the said composition and articles obtained therewith.

Polylactic acid is a biodegradable thermoplastic polyester originating from a renewal source. Its mechanical properties make it an ideal candidate for the replacement of conventional thermoplastic polymers, especially in the case of applications where high rigidity is required, such as for example in the manufacture of throwaway cutlery, rigid containers or caps for drinks containers.

Despite the fact that polylactic acid can be used in standard machinery with minimum modifications, some of its properties nevertheless have not hitherto let it be utilised widely and extensively as a replacement for conventional thermoplastic materials.

In the injection moulding sector, for example, one of the greatest difficulties associated with the use of polylactic acid and its compositions with other biodegradable polymers lies in the high tendency for articles made therewith to deform if subjected to high loads at temperatures above ambient temperature. This is because in the manufactures obtained using normal injection moulding production processes polylactic acid is mainly present as an amorphous polymer, which is therefore only rigid well below its glass transition temperature, of approximately 60° C. Typically this tendency is mitigated by increasing the percentage crystallinity of polylactic acid, for example by subjecting articles to annealing heat treatments. Nevertheless, even though this technique brings about a substantial increase in an article's heat deflection temperature, it also results in its deformation. Consequently special precautions have to be taken during the stages of designing and producing the said articles, which has an adverse effect on their industrial processability.

In consideration of the above it would therefore be desirable to have a biodegradable composition containing polylactic acid which is capable of being transformed economically and productively into articles having a high heat deflection temperature without compromising their dimensional stability.

In particular, this invention relates to a biodegradable polymer composition for the production of articles having a high heat deflection temperature comprising:
i) 40-70% by weight, preferably 45-65% by weight, with respect to the sum of components i and ii, of a polyester of lactic acid;
ii) 30-60% by weight, preferably 35-55% by weight, with respect to the sum of components i and ii, of at least one aromatic aliphatic polyester (AAPE) comprising a dicarboxyl component and a diol component comprising the following structural units:

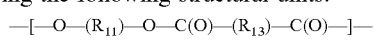

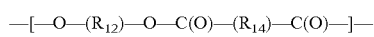

in which the diol component comprises a —O—($R_{11}$)—O— and
—O—($R_{12}$)—O— units derived from diols, in which $R_{11}$ and $R_{12}$ are the same or different and are selected from the group comprising C2-C14 alkylenes, C5-C10 cycloalkylenes, C2-C12 oxyalkylenes, heterocyclic groups and their mixtures, in which the dicarboxylic component comprises —C(O)—($R_{13}$)—C(O)— units deriving from aliphatic diacids and —C(O)—($R_{14}$)—C(O)— units deriving from aromatic diacids, in which $R_{13}$ is selected from the group comprising C0-C20 alkylenes and their mixtures and the molar percentage of the units derived from the aromatic diacids is more than 50% and less than or equal to 70 mol % of the dicarboxyl component;
iii) 0 to less than 1% by weight, with respect to the total weight of the biodegradable polymer composition, of cellulose fibres;
iv) 1-10% by weight, preferably 2-6% by weight, with respect to the total weight of the biodegradable polymer composition, of a nucleating agent selected from polyesters comprising repeating units of 1,4-butylene succinate, talc and mixtures thereof.

As far as the lactic acid polyester is concerned (component i), this is advantageously selected from poly-L-lactic acid, poly-D-lactic acid and the stereo complex of poly-D-L-lactic acid or mixtures thereof.

Polymers or copolymers of polylactic acid containing at least 95% by weight of repeating units derived from L-lactic acid or D-lactic acid or their combinations having a molecular weight Mw of more than 50,000 and a shear viscosity of between 50-500 Pas, preferably between 100-300 Pas (measured according to standard ASTM D3835 at T=190° C., shear rate=1000 $s^{-1}$, D=1 mm, L/D=10) are particularly preferred.

In a particularly preferred embodiment the lactic acid polyester comprises 98% by weight of units deriving from L-lactic acid, 2% of repeated units deriving from D-lactic acid, has a melting point in the range 160-170° C., a glass transition temperature (Tg) in the range 55-65° C. and an MFR (measured according to standard ASTM-D1238 at 190° C. and 2.16 kg) within the range 10-60 g/10 min, preferably 15-40 g/10 min.

The process for production of the lactic acid polyester may take place according to any one of the known processes in the state of the art. In particular, this polyester may advantageously be obtained through a polymerisation reaction by opening the ring from the lactide.

As far as the aliphatic-aromatic polyester AAPE is concerned (component ii), the dicarboxyl component comprises units deriving from aliphatic diacids and aromatic diacids of the type described above.

Of the aliphatic diacids, succinic acid, adipic acid, suberic acid, azelaic acid, sebacic acid, undecandioic acid, dodecandioic acid, brassylic acid, hexadecandioic acid and octadecandioic acid are particularly preferred. Mixtures of these diacids are also particularly useful.

Diacids having unsaturations within the chain, such as for example itaconic acid and maleic acid, are also included.

As far as the aromatic diacids are concerned, in the aliphatic-aromatic polyester AAPE these are advantageously selected from dicarboxylic aromatic compounds of the phthalic acid type and their esters and heterocyclic dicarboxylic aromatic compounds and their esters and their mixtures. Preferably the said mixtures comprise up to 30% in moles of dicarboxylic aromatic diacids of the phthalic acid type.

As far as the heterocyclic dicarboxylic aromatic compounds are concerned, these are advantageously of renewable origin, this term meaning those products obtained from sources which because of their intrinsic characteristics are regenerated in nature or are not exhaustible on the scale of a human lifetime and, by extension, whose use will not prejudice natural resources for future generations. The use of products of renewable origin also helps to reduce $CO_2$ in the atmosphere and reduce the use of non-renewable resources. A typical example of a renewable source is that of plant crops.

As far as dicarboxylic aromatic diacids of the phthalic acid type are concerned, terephthalic acid is particularly preferred, while with regard to the heterocyclic dicarboxylic aromatic compounds 2,5-furandicarboxylic acid is particularly preferred.

The content of units deriving from aromatic diacids in the aliphatic-aromatic polyester AAPE is 40-70%, preferably higher than 50% and more preferably between 55-60% in moles with respect to the total diacids content in moles.

As regards the diol component of the aliphatic-aromatic polyester AAPE, this derives from diols preferably selected from 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexanedimethanol, propylene glycol, neo-pentyl glycol, 2-methyl-1,3-propandiol, dianhydrosorbitol, dianhydromannitol, dianhydroinitol, cyclohexandiol, cyclohexanmethandiol and their mixtures. Among the diols, 1,2-ethandiol, 1,3 propandiol, 1,4-butandiol and their mixtures are particularly preferred.

The aliphatic-aromatic polyester AAPE may contain at least one hydroxy acid in a quantity of between 0-49%, preferably between 0-30% in moles with respect to the moles of aliphatic dicarboxylic acid, in addition to the base monomers. Examples of convenient hydroxy acids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactides. The hydroxy acids may be inserted into the chain as such or may be first caused to react with diacids or diols.

Long molecules with two functional groups, including those with a functional group which is not in a terminal position, may also be added in quantities not exceeding 10%. Examples are dimer acids, ricinoleic acid and acids incorporating epoxy functional groups and also polyoxyethylenes having a molecular weight of between 200 and 10,000.

Amines, amino acids and amino alcohols may also be present in percentages up to 30% in moles in relation to all the other components.

In the process for preparation of the aliphatic-aromatic polyester AAPE one or more molecules having multiple functional groups may advantageously be added in quantities between 0.1 and 3% in moles with respect to the quantity of dicarboxylic acids (and any hydroxy acids) in order to obtain branched products. Examples of these molecules are glycerol, pentaerythritol, trimethylol propane, citric acid, dipentaerythritol, monoanhydrosorbitol, monohydromannitol, acid triglycerides, polyglycerols, etc.

In a particularly preferred embodiment the aliphatic-aromatic polyester AAPE is biodegradable in the meaning of standard EN 13432.

The molecular weight $M_n$ of the aliphatic-aromatic polyester AAPE is preferably greater than 30,000. As far as the polydispersity index of the molecular weights Mw/Mn is concerned, this on the other hand is preferably between 1.5 and 10.

The molecular weights $M_n$ and $M_w$ may be measured by Gel Permeation Chromatography (GPC). The determination may be performed with the chromatography system held at 40° C., using a set of three columns in series (particle diameter 5μ and respective porosities of 500 A, 1000 A and 10,000 A), a refractive index detector, chloroform as eluent (flow 1 ml/min) and using polystyrene as the reference standard.

The Melt Flow Rate (MFR) of the aliphatic-aromatic polyester AAPE is preferably between 500 and 1 g/10 min, more preferably between 100 and 5 g/10 min, even more preferably between 50 and 6 g/10 min (measurement made at 190° C./2.16 kg according to standard ASTM D1238-89 "Standard Test Method for Melt Flow Rates of Thermoplastics by Extrusion Plastometer").

Preferably the aliphatic-aromatic polyester AAPE has an inherent viscosity (measured using an Ubbelohde viscosimeter for solutions of concentration 0.2 g/dl in $CHCl_3$ at 25° C.) of more than 0.4, preferably between 0.4 and 2, more preferably between 0.7 and 1.5 dl/g.

The aliphatic-aromatic polyester AAPE may be a block copolymer or a random copolymer, the latter being preferred.

The process for production of the aliphatic-aromatic polyester AAPE may take place according to any of the known processes in the state of the art. In particular this polyester may advantageously be obtained by means of a polycondensation reaction. Advantageously the process of polymerising the polyester may be performed in the presence of a suitable catalyst. Among such suitable catalysts mention may be made by way of example of organometallic compounds of tin, for example stannoic acid derivatives, titanium compounds, for example orthobutyltitanate, aluminium compounds, for example Al-triisopropyl, and compounds of antimony and zinc.

The aliphatic-aromatic polyester AAPE may also be obtained by a process of reactive extrusion from a precursor polyester (PP) comprising units deriving from at least one diacid and at least one substantially linear diol with a MFI of 5-30 dl/g at 190° C. and 2.16 kg, having a mean weighted molecular weight $M_w$ measured by GPC of between 60,000-120,000 and an content of active sites such as unsaturations in an amount of 0.1-1% in moles and/or terminal acid groups in a quantity of 10-200 meq of KOH, the said reactive extrusion process being performed through the addition of a compound selected from peroxides, epoxides or carbodiimides, such as those mentioned above.

If the said reactive extrusion process is carried out using peroxides, these are used in quantities of 0.001-0.2% and preferably 0.01-0.1% by weight with respect to the sum of the polymers fed to the reactive extrusion process.

As far as the addition of epoxides is concerned, these are preferably used in a quantity of 0.1-2%, more preferably 0.2-1% by weight with respect to the sum of the polymers fed to the reactive extrusion process.

If carbodiimides are used, these are preferably used in a quantity of 0.05-2%, more preferably 0.1-1% by weight with respect to the sum of the polymers fed to the reactive extrusion process.

Mixtures of the said peroxides, epoxides and carbodiimides may also be used.

Preferably the said precursor polyester PP has an MFI of 5-30 and more preferably 7-20 g/10 min at 190° C. and 2.16 kg, a shear viscosity of 400-900 Pas and a weighted mean molecular weight Mw of preferably between 100,000-130,000.

Preferably the said precursor polyester PP has an unsaturations content of 0.1-0.8% and more preferably 0.2-0.7% in moles.

The unsaturations may be generated in situ during the polymerisation stage or processing of the precursor polyester PP or through the insertion of suitable unsaturated monomers or unsaturated chain endings.

Precursor polyesters PP with terminal unsaturations are particularly preferred. Among unsaturated chain terminations those preferred are those having the following structure:

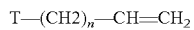

in which "T" is a group capable of reacting with carboxyl and/or hydroxyl groups, for example a hydroxyl, carboxyl, amine, amide or stereo group, and "n" is a whole number between 0 and 13.

The said unsaturated chain terminators may also be used as a mixture.

As far as "T" is concerned, this is preferably a hydroxyl or carboxyl group.

The whole number "n" preferably lies between 1 and 13, more preferably between 3 and 13 and even more preferably 8 or 9.

Particularly preferred unsaturated chain terminators include omega-undecenoic acid, omega-undecenyl alcohol and their mixtures.

The presence of unsaturations and/or adducts deriving from the reaction of these following reactive extrusion may be determined by different methods which are well known to those skilled in the art, such as NMR spectroscopy or methanolysis reactions of the polymer chain coupled with chromatographic methods combined with mass spectrometry.

Those skilled in the art will easily be able to identify the structures relating to unsaturations as such or adducts deriving from their reaction following reactive extrusion.

As far as measurement of the unsaturations content by NMR is concerned, this may be performed by 300 MHz H1 NMR using a pulse-acquisition sequence characterised by a pulse phase of 30°, a spectral amplitude=4 kHz, a delay of 5 seconds and performing 6000 scans.

Preferably the aliphatic-aromatic polyester AAPE can be obtained by a reactive extrusion process from a precursor polyester PP having a terminal acid groups content of 35-150 meq of KOH/kg of polyester.

The terminal acid groups content may be measured as follows: 1.5-3 g of the polyester are placed in a 100 ml flask together with 60 ml of chloroform. After the polyester has completely dissolved 25 ml of 2-propanol are added, and immediately before analysis 1 ml of deionised water. The solution so obtained is titrated against a previously standardised solution of KOH in ethanol. An appropriate indicator, such as for example a glass electrode for acid-base titrations in non-aqueous solvents, is used to determine the end point of the titration. The terminal acid groups content is calculated on the basis of the consumption of KOH solution in ethanol using the following equation:

$$\text{Terminal acid groups content (meq KOH/kg polymer)} = \frac{\lfloor (V_{eq} \cdot V_b) \cdot T \rfloor \cdot 1000}{P}$$

in which:
$V_{eq}$=ml of KOH solution in ethanol at the end point of the titration of the sample;
$V_b$=ml of KOH solution in ethanol required to achieve a pH=9.5 in the blank titration;
T=concentration of the KOH solution in ethanol expressed in moles/liter;
P=weight of the sample in grams.

The process of producing the precursor polyester PP may take place according to any of the processes known in the state of the art described above.

Concerning the nucleating agents of the biodegradable polymeric composition, they are selected from polyesters comprising repeating units of 1,4-butylene succinate, talc and mixtures thereof.

With regard to the polyesters comprising repeating units of 1,4-butylene succinate, poly(1,4-butylene succinate) and poly(1,4-butylene succinate-co-1,4-butylene alkylate) copolymers are preferred, poly(1,4-butylene succinate) being more preferred. As far as poly(1,4-butylene succinate-co-1,4-butylene alkylate) copolymers are concerned, they advantageously shows a crystallization temperature higher than 80° C., more preferably higher than 90° C. still more preferably higher than 100°. The 1,4-butylene-alkylate repeating units advantageously comprise C2-C20 aliphatic diacids residues and, among C2-C20 aliphatic diacids, adipic acid, sebacic acid and azelaic acid and mixtures thereof are preferred. Preferably, the polyesters comprising repeating units of 1,4-butylene succinate have a MFR (determined according to ASTM 1238-10 at 190° C. and 2.16 kg) higher than 10 g/10 min, more preferably 20 g/10 minutes, more preferably higher than 30 g/10 minutes.

In a preferred embodiment of the present invention, the nucleating agents of the biodegradable polymeric composition comprises a mixture of polyesters comprising repeating units of 1,4-butylene succinate and talc, wherein said mixture comprises 10-95 wt % and more preferably 30-85 wt % of said polyesters. In a particularly preferred embodiment the polyester of said mixture is poly(1,-4 butylene succinate).

The polymer composition according to this invention may also contain one or more other additives, for example fillers, anti-caking agents, cross-linking agents, compatibilizing agents, plasticisers, pigments and dyes.

As far as fillers are concerned, these may be inorganic and/or organic. Examples of particularly preferred inorganic fillers are: sepiolite, montmorillonite, calcium carbonate, silica, mica, kaolin, titanium dioxide and wollastonite.

The process of producing the polymer composition according to this invention may take place according to any of the processes known in the state of the art. Advantageously the polymer composition according to this invention is produced by means of extrusion processes in which the components are mixed in the fused state. When extruding the composition the components may be fed altogether or one or more of these may be fed separately along the extruder. In a particularly preferred embodiment of the process for producing the biodegradable polymer composition according to the invention the components i)-iv) are fed altogether to the extruder.

The biodegradable polymer composition according to this invention is particularly suitable for use in injection moulding and thermoforming, and in spinning.

Its properties may in fact allow it to be used to manufacture injection moulded or thermoformed articles having a heat deflection temperature (HDT) comprised between 85° C. and 65° C. when measured according to standard ASTM-D648 using a load of 0.455 MPa or comprised between 70 and 50° C. when measured according to standard ASTM-D648 using a load of 1.82 MPa. Products showing such range of HDT are particularly suitable to be transformed in injection moulded or thermoformed articles without occurrence of deformations if subjected to high loads at high temperatures. This renders said compositions particularly suitable for the production of throwaway cutlery, cups, rigid containers, caps for the dispensing of drinks, preferably hot drinks, lids and covers, and packaging for food which can be reheated in conventional ovens and microwaves.

The biodegradable polymer composition according to the invention is therefore particularly suitable for the manufacture of throwaway cutlery, cups, rigid containers, lids and covers, and packaging for food.

Moreover, it has been discovered that the biodegradable polymeric composition according to the invention is particularly suitable for the manufacture of capsules for dispensing drinks, preferably hot drinks such as coffee and tea. Without willing to be bound to any specific theory, it has been observed that the biodegradable polymeric composition according to the invention shows a co-continuous morphology allowing the capsules to keep suitable tensile properties, particularly breaking at load and elongation at break, as well as dynamic modulus even at high temperatures (i.e. a dynamic modulus in the range of 450-150 MPa and preferably between 350 and 180 MPa at 80° C.). This allows the capsules to show sufficient dimensional stability and integrity rendering them usable with the conventional capsule coffee and tea makers currently available in the market. In this regard, in order to achieve the best results in terms of dimensional stability and to preserve the integrity of the capsules while dispensing the hot drinks, the amount of polyester of lactic acid has to be 40-70% by weight, preferably 45-65% by weight, with respect to the sum of components i and ii.

In a particularly preferred embodiment, the present invention refers to a capsule for the dispensing of drinks, such as coffee and tea, comprising the biodegradable polymeric composition according to the present invention.

In a preferred embodiment of the present invention, the capsules for dispensing of drinks according to the present invention are free of cellulose fibers (i.e. do not contain cellulose fibers). This has the advantage of further improving their performance in use with respect to the preservation of the capsule's integrity, particularly when the dispensation of hot drinks occurs using machines working at elevated pressure.

As far as injection moulding is concerned, the biodegradable polymer composition according to the present invention has the further advantage that it can be fed to conventional machinery without requiring substantial changes to normal operating conditions in comparison with other conventional polymers such as for example polyethylene, polypropylene, polystyrene and ABS. Preferably, in the case of objects having a maximum thickness of the order of 1 millimeter, these may be moulded using a fusion temperature of 210° C., an oleodynamic pressure of 80 bar, a cooling time of 4 sec and a cycle time of 12 sec.

In a particularly preferred embodiment, injection moulded articles comprising the composition according to this invention are subjected to hot annealing treatments at temperatures between 70 and 150° C. This invention also relates to articles obtained by means of the said annealing treatments (known as annealed products).

These annealing treatments may advantageously be performed in an unconfined environment at constant temperature, for example within a stove. In this case the annealing treatments are preferably carried out at temperatures between 80-150° C. and with residence times of 15 sec-60 min, preferably 30 sec-30 min and even more preferably 40 sec-5 min, with this being particularly advantageous from the production point of view. The specific conditions which have to be used will vary depending on the dimensions of the object which has to be subjected to annealing treatment and the degree of heat resistance required by the application. In general in the case of thick objects it is preferable to use higher temperatures and/or longer residence times.

The said annealing treatments may also be performed in a confined environment, for example within preheated moulds at constant temperature, preferably between 80-100° C., for 0.5-60 minutes. The specific conditions which have to be used will vary depending upon the size of the object being subjected to annealing treatment. In general, in the case of thick objects it is preferable to use longer residence times.

The invention will now be illustrated by a number of embodiments which are to be regarded by way of example and not restrictive of the scope of the protection of this patent application.

EXAMPLES

In the examples described below:
Shear viscosity was measured using a Goettfert Rheotester 2000 model rheometer according to standard ASTM-D3835 at a temperature of 190° C. using a capillary with D=1 mm and L/D=10 flat entry.
Mechanical properties were measured according to standard ASTM D638 $V_0$=50 mm/min on standard test specimens of the dumbbell type using an Instron 4301 model dynamometer. The following were determined: Elastic Modulus (in MPa), deformation on failure (as %) and ultimate tensile strength (in MPa).
Heat deflection temperature (HDT) was measured according to standard ASTM-D648 using two different loads, 0.455 MPa and 1.82 MPa, on moulded test specimens of the "bar" type (length 127 mm, width 12.7 mm, thickness 3.2 mm) using Ceast 6510 Test-A-Matic model equipment. HDT values were determined in triplicate for each composition. The value stated corresponds to the arithmetic mean of the measured values.

Example 1

TABLE 1

| Composition in Example 1 | | | | | | | |
|---|---|---|---|---|---|---|---|
| | | | Anti-caking | Nucleating agent | | Inorganic | Hydrolysis |
| Example | PLA | AAPE | agent | talc | PBS | filler | stabiliser |
| 1 | 58.9 | 34.2 | 1 | 0.6 | 2.4 | 1 | 0.04 |

Where not explicitly indicated the figures are expressed in parts.

PLA=polylactic acid containing 98% of L-Lactic and 2% of D-Lactic, melting point Tm=165° C., weighted mean molecular weight Mw=166000, intrinsic viscosity=0.97 dl/g and shear viscosity ☐☐=120 Pas measured according to standard ASTM-D3835 at T=190° C., shear rate=1000 s$^{-1}$, and capillary D=1 mm with L/D=10.

AAPE=poly(butylenesebacate-co-butyleneterephlate) (PBST) having 56% in moles of terephthalic acid with respect to the sum of the aliphatic diacids and aromatic diacids, and having MFI=14 g/10 min (at 190° C. and 2.16 kg), and shear viscosity η=570 Pas measured according to standard ASTM-D3835 at T=180° C., shear rate=104 s$^{-1}$, and capillary D=1 mm with L/D=30.

Anti-caking agent=oleamide of plant origin

Nucleating agent=talc=micronised talc (particle size 2-10 microns)

PBS=poly(1,4-butylene succinate) MFR 46 g/10' (measured according to ASTM 1238-10 at 190° C./2.16 kg)

Inorganic filler=Titanium dioxide

Hydrolysis stabiliser=styrene-glycidyl ether-methylmethacrylate copolymer having Mw=7300, Mn=2750, Tg=54° C., equivalent weight of epoxide=285 g/mol, number of epoxides per molecule=10.

The composition in Table 1 was fed to a model APV2030 co-rotating twin-screw extruder under the following conditions: D=30 mm; L/D=40; RPM=170; thermal profile=30° C.-90° C.-140° C.-150° C.-9×200° C.-3×150° C.

The granules were then injection moulded in a Sandretto S7/60 model press in a mould to produce dumbbell and "bar" specimens using in both cases the following injection moulding operating conditions:

injection T=200° C.;
Injection pressure=1250 bar;
Injection time=0.7 sec;
Injection flowrate=25 cm$^3$/sec;
Holding pressure=200 bar;
Holding time=11 sec;
Cooling time=25 sec;
Mould temperature=20° C.;
Screw rotation=80 rpm.

The dumbbell specimens obtained were examined to determine their properties. The results of the characterisations are shown in Table 2 and 3.

TABLE 2

Mechanical characterisation according to ASTM-D638

|  | Elastic modulus (MPa) | Deformation on failure (%) | Ultimate tensile strength (MPa) |
|---|---|---|---|
| Example 1 | 2176 | 114 | 20 |

TABLE 3

HDT according to ASTM-D648

| | HDT (° C.) | |
|---|---|---|
| | load = 0.455 MPa | load = 1.82 MPa |
| Example 1 | 75 | 60 |

The invention claimed is:

1. A biodegradable polymeric composition for preparing articles having high heat deflection temperature comprising:

i) 40-70% by weight, with respect to the sum of components i and ii, of a polyester of lactic acid;

ii) 30-60% by weight, with respect to the sum of components i and ii, of at least one aromatic aliphatic polyester comprising a dicarboxyl component and a diol component comprising the following structural units:

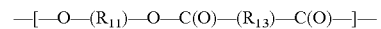

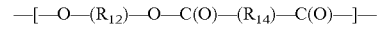

in which the diol component comprises a —O—($R_{11}$)—O— and
—O—($R_{12}$)—O— units derived from diols, in which $R_{11}$ and $R_{12}$ are the same or different and are selected from the group consisting of C2-C14 alkylenes, C5-C10 cycloalkylenes, C2-C12 oxyalkylenes, heterocyclic groups, and mixtures thereof, in which the dicarboxylic component comprises —C(O)—($R_{13}$)—C(O)— units deriving from aliphatic diacids and —C(O)—($R_{14}$)—C(O)— units deriving from aromatic diacids, in which $R_{13}$ is selected from the group consisting of C0-C20 alkylenes and mixtures thereof and the molar percentage of the units derived from the aromatic diacids is more than 50% and less than or equal to 70 mol % of the dicarboxyl component;

iii) 0 to less than 1% by weight, with respect to the total weight of the biodegradable polymer composition, of cellulose fibres;

iv) 1-10% by weight with respect to the total weight of the biodegradable polymer composition, of a nucleating agent, wherein the nucleating agent comprises a mixture of polyesters comprising repeating units of 1,4-butylene succinate and talc, said mixture comprising 10-95% by weight of said polyesters said biodegradable polymeric composition having a heat deflection temperature between 85° C. and 65° C. when measured according to standard ASTM-D648 using a load of 0.455 MPa, or between 70 and 50° C. when measured according to standard ASTM-D648 using a load of 1.82 MPa.

2. The biodegradable composition according to claim 1, wherein the polyester of lactic acid is selected from the group consisting of poly-L-lactic acid, poly-D-lactic acid, a stereocomplex of the poly-L-lactic acid, and poly-D-lactic acid, and mixtures thereof.

3. The biodegradable composition according to claim 2, wherein the aromatic aliphatic polyester is biodegradable according to the EN 13432 norm.

4. The biodegradable composition according to claim 2, wherein the polyester comprising repeating units of 1,4-butylene succinate is poly(1,4-butylene succinate).

5. The biodegradable composition according to claim 1, wherein the aliphatic diacid of the aromatic aliphatic polyester are selected from the group consisting of succinic acid, adipic acid, suberic acid, azelaic acid, sebacic acid, undecandioic acid, dodecandioic acid, brassylic acid, hexadecandioic acid and octadecandioic acid, and mixtures thereof.

6. The biodegradable composition according to claim 5, wherein the aromatic aliphatic polyester is biodegradable according to the EN 13432 norm.

7. The biodegradable composition according to claim 5, wherein the polyester comprising repeating units of 1,4-butylene succinate is poly(1,4-butylene succinate).

8. The biodegradable composition according to claim 1, wherein the aromatic diacid is selected from the group consisting of phthalic acid, isophthalic acid, terephthalic acid, and esters thereof, heterocyclic aromatic compounds and esters thereof, and mixtures thereof.

9. The biodegradable composition according to claim 8, wherein the aromatic aliphatic polyester is biodegradable according to the EN 13432 norm.

10. The biodegradable composition according to claim 8, wherein the polyester comprising repeating units of 1,4-butylene succinate is poly(1,4-butylene succinate).

11. The biodegradable composition according to claim 8, wherein the heterocyclic aromatic compound is 2,5-furandicarboxylic acid.

12. The biodegradable composition according to claim 11, wherein the aromatic aliphatic polyester is biodegradable according to the EN 13432 norm.

13. The biodegradable composition according to claim 11, wherein the polyester comprising repeating units of 1,4-butylene succinate is poly(1,4-butylene succinate).

14. The biodegradable composition according to claim 8, wherein the aromatic diacid is terephthalic acid.

15. The biodegradable composition according to claim 14, wherein the aromatic aliphatic polyester is biodegradable according to the EN 13432 norm.

16. The biodegradable composition according to claim 1, wherein the aromatic aliphatic polyester is biodegradable according to the EN 13432 norm.

17. The biodegradable composition according to claim 1, wherein the polyester comprising repeating units of 1,4-butylene succinate is poly(1,4-butylene succinate).

18. An injection molded article comprising the biodegradable composition according to claim 1.

19. A capsule for dispensing drinks comprising the biodegradable composition according to claim 1.

20. The capsule according to claim 19, wherein said capsule is free of cellulose fibers.

* * * * *